United States Patent
Garg et al.

(10) Patent No.: US 8,761,253 B2
(45) Date of Patent: Jun. 24, 2014

(54) INTRA PREDICTION MODE SEARCH SCHEME

(75) Inventors: Atul Garg, Sunnyvale, CA (US); Thomas Karpati, San Francisco, CA (US); Jackson Lee, Los Altos Hills, CA (US); Ignatius Tjandrasuwita, Atherton, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1187 days.

(21) Appl. No.: 12/128,050

(22) Filed: May 28, 2008

(65) Prior Publication Data
US 2009/0296813 A1    Dec. 3, 2009

(51) Int. Cl.
*H04N 11/02*    (2006.01)

(52) U.S. Cl.
USPC ............. 375/240.12; 375/240.13; 375/240.16

(58) Field of Classification Search
USPC ............................ 375/240.13, 240.16, 240.12
See application file for complete search history.

(56) References Cited

U.S. PATENT DOCUMENTS

| | | | | |
|---|---|---|---|---|
| 5,859,668 A * | 1/1999 | Aono et al. | ............... | 375/240.15 |
| 6,025,888 A | 2/2000 | Pauls | | |
| 6,765,964 B1 * | 7/2004 | Conklin | ................... | 375/240.14 |
| 7,170,937 B2 * | 1/2007 | Zhou | ......................... | 375/240.01 |
| 7,289,674 B2 * | 10/2007 | Karczewicz | .................. | 382/238 |
| 7,499,492 B1 * | 3/2009 | Ameres et al. | ............ | 375/240.12 |
| 7,706,442 B2 * | 4/2010 | Kuo | .......................... | 375/240.12 |
| 7,751,476 B2 * | 7/2010 | Tanizawa et al. | ......... | 375/240.03 |
| 7,953,284 B2 * | 5/2011 | Au et al. | ........................ | 382/236 |
| 8,059,717 B2 * | 11/2011 | Saigo et al. | ............... | 375/240.12 |
| 8,121,194 B2 * | 2/2012 | Shima | ....................... | 375/240.16 |
| 8,315,467 B2 * | 11/2012 | Nakamura et al. | ............ | 382/232 |
| 8,355,449 B2 | 1/2013 | Moccagatta et al. | | |
| 8,437,405 B1 | 5/2013 | Moccagatta et al. | | |
| 2002/0159525 A1 | 10/2002 | Jeong | | |
| 2003/0158608 A1 | 8/2003 | Ishikawa et al. | | |
| 2003/0223645 A1 * | 12/2003 | Sun et al. | ........................ | 382/239 |
| 2003/0235249 A1 * | 12/2003 | Zhao et al. | ............... | 375/240.13 |
| 2004/0028282 A1 * | 2/2004 | Kato et al. | .................... | 382/236 |
| 2004/0114576 A1 * | 6/2004 | Itoh et al. | ....................... | 370/352 |
| 2004/0184548 A1 | 9/2004 | Kerbiriou et al. | | |
| 2005/0089094 A1 * | 4/2005 | Yoo et al. | ................. | 375/240.12 |
| 2005/0147165 A1 * | 7/2005 | Yoo et al. | ................. | 375/240.14 |
| 2005/0157797 A1 * | 7/2005 | Gaedke | .................... | 375/240.24 |
| 2005/0249293 A1 | 11/2005 | Zeng et al. | | |
| 2006/0018385 A1 * | 1/2006 | Lee | ........................... | 375/240.24 |
| 2006/0126730 A1 * | 6/2006 | Arakawa et al. | ......... | 375/240.03 |
| 2006/0233447 A1 | 10/2006 | Matsubara | | |
| 2006/0251330 A1 * | 11/2006 | Toth et al. | ..................... | 382/236 |
| 2006/0268990 A1 | 11/2006 | Lin et al. | | |

(Continued)

FOREIGN PATENT DOCUMENTS

| | | |
|---|---|---|
| JP | 2007013298 | 1/2007 |
| JP | 2008227670 | 9/2008 |
| KR | 1020060027795 | 11/2005 |
| WO | 2004104930 | 12/2004 |

*Primary Examiner* — Ricky Ngo
*Assistant Examiner* — Dewanda Samuel (57) ABSTRACT

The following embodiments describe an approach for selecting an intra prediction mode for video encoding, such as occurs in the H.264 standard. One embodiment describes a method of selecting an optimum intra prediction mode. This method involves selecting a first intra prediction mode, which is used to determine a search order for a number of intra prediction modes. These intra prediction modes are then evaluated in order to identify the optimum intra prediction mode.

18 Claims, 6 Drawing Sheets

Intra Prediction Pipeline 600

(56) References Cited

U.S. PATENT DOCUMENTS

| | | |
|---|---|---|
| 2007/0019726 A1* | 1/2007 | Cha et al. .................. 375/240.24 |
| 2007/0217508 A1* | 9/2007 | Shimada et al. ......... 375/240.03 |
| 2007/0229325 A1* | 10/2007 | Yokose et al. ................... 341/51 |
| 2008/0031346 A1* | 2/2008 | Segall ....................... 375/240.19 |
| 2008/0192822 A1* | 8/2008 | Chang et al. ............. 375/240.03 |
| 2008/0232471 A1* | 9/2008 | Mittal et al. ............. 375/240.13 |
| 2008/0291995 A1* | 11/2008 | Graham et al. .......... 375/240.02 |
| 2009/0034856 A1* | 2/2009 | Moriya et al. ................. 382/238 |
| 2009/0154560 A1* | 6/2009 | Hong et al. .............. 375/240.15 |
| 2009/0207919 A1* | 8/2009 | Yin et al. ................. 375/240.25 |
| 2010/0158105 A1 | 6/2010 | Garg et al. |
| 2010/0166073 A1* | 7/2010 | Schmit et al. ............ 375/240.16 |

* cited by examiner

FIG. 1

| 201 Block | 202 Block | 203 Block | 204 Block |
|---|---|---|---|
| 205 Block | 206 Block | 207 Block | 208 Block |
| 209 Block | 210 Block | 211 Block | 212 Block |
| 213 Block | 214 Block | 215 Block | 216 Block |

Macroblock 200

FIG. 2

Mode Relationship
Representation 399

FIG. 3

Flowchart 400

FIG. 4

Flowchart 500

INTRA PREDICTION MODE SEARCH SCHEME

BACKGROUND

1. Field of the Invention

Embodiments of the present invention relate to intra prediction used in digital video compression.

2. Related Art

Some methods of video compression use spatial prediction to compress raw video streams. Spatial prediction includes predicting pixels within a macroblock from pixels in previously encoded adjacent macroblocks. This approach is known as intra spatial prediction, and is used in H.264 video compression.

Part of the intra prediction process involves determining which of nine possible prediction modes for each 4×4 luma block within a 16×16 macroblock. As such, in 4×4 intra mode, current intra prediction techniques involve 144 such determinations for each macroblock. Similar determinations must be made as well for each 16×16 luma block in 16×16 intra mode to determine the best of four possible prediction modes, and for 8×8 chroma block in 8×8 intra mode to determine the best of four possible prediction modes. Selecting the optimal mode is therefore a computationally expensive task.

SUMMARY

The following embodiments describe an approach for selecting an intra prediction mode for video encoding, such as occurs in the H.264 standard. One embodiment describes a method of selecting an optimum intra prediction mode. This method involves selecting a first intra prediction mode, which is used to determine a search order for a number of intra prediction modes. These intra prediction modes are then evaluated in order to identify the optimum intra prediction mode.

Another embodiment describes a computer-readable medium having computer-executable instructions for performing a number of steps. These steps include computing in most probable intra prediction mode, and selecting a number of intra prediction modes, with reference to the most probable intra prediction mode. An optimum intra prediction mode is identified from this collection of intra prediction modes.

A further embodiment describes a system for selecting an intra prediction mode. The system includes a prediction mode search order lookup table. A demultiplexer is coupled to the prediction mode search order lookup table. A prediction block is coupled to the demultiplexer. A comparator is coupled to the prediction block. The prediction mode search order lookup table selects an array of intra prediction modes in order of probability, with reference to the most probable intra prediction mode. The demultiplexer selects an intra prediction mode from the array for the prediction block to evaluate. The comparator determines the optimum intra prediction mode.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in figures herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Further, while embodiments described herein may make reference to a GPU, it is to be understood that the circuits and/or functionality described herein could also be implemented in other types of processors, such as general-purpose or other special-purpose coprocessors, or within a CPU.

Basic Computing System

Figure 1:
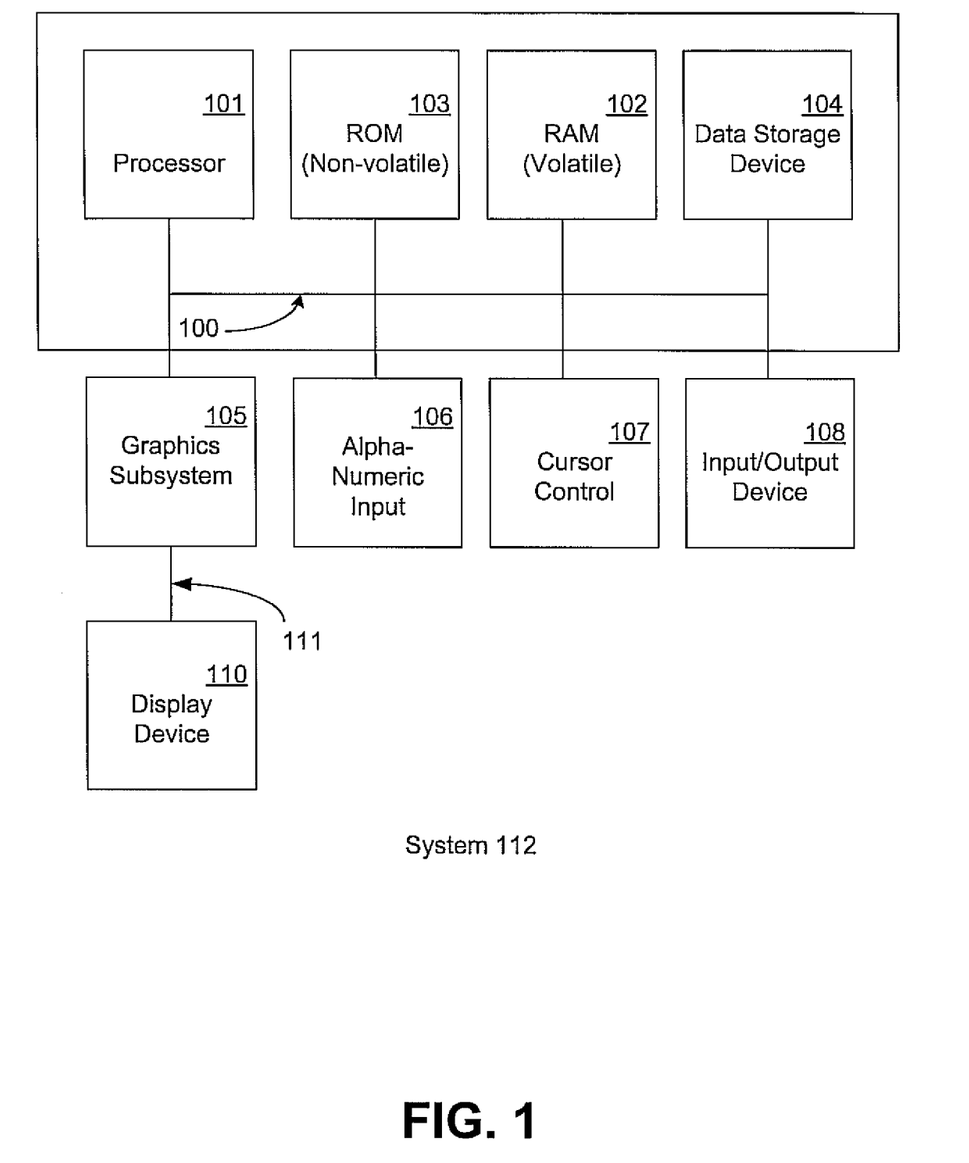
FIG. 1 is a block diagram of an exemplary computer system upon which embodiments of the present invention may be implemented.

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like.

Similarly, system 112 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

Intra Prediction Mode Search Scheme

In the following embodiments, an approach is described in which reduces the computational expense of selecting an optimum prediction mode. In one embodiment, the complexity of intra prediction is reduced, by changing the order in which each possible prediction mode is evaluated based upon a calculated most probable mode. Moreover, the number of modes which are evaluated can be further limited, e.g., by user input, without substantially reducing the quality of the compression process.

Because each 4×4 block in a macroblock undergoes the intra prediction process, any reduction in the computational cost of the intra prediction process results in a substantial improvement over the course of processing a single macroblock, and is even more significant over the length of a video stream.

Additionally, in different embodiments, this approach can be extended to other aspects of intra prediction, e.g., selecting between the four valid modes available for 8×8 chroma blocks, or the 9 8×8 intra prediction modes for luma blocks in "high profile" H.264 applications.

Exemplary Macroblock

Figure 2:
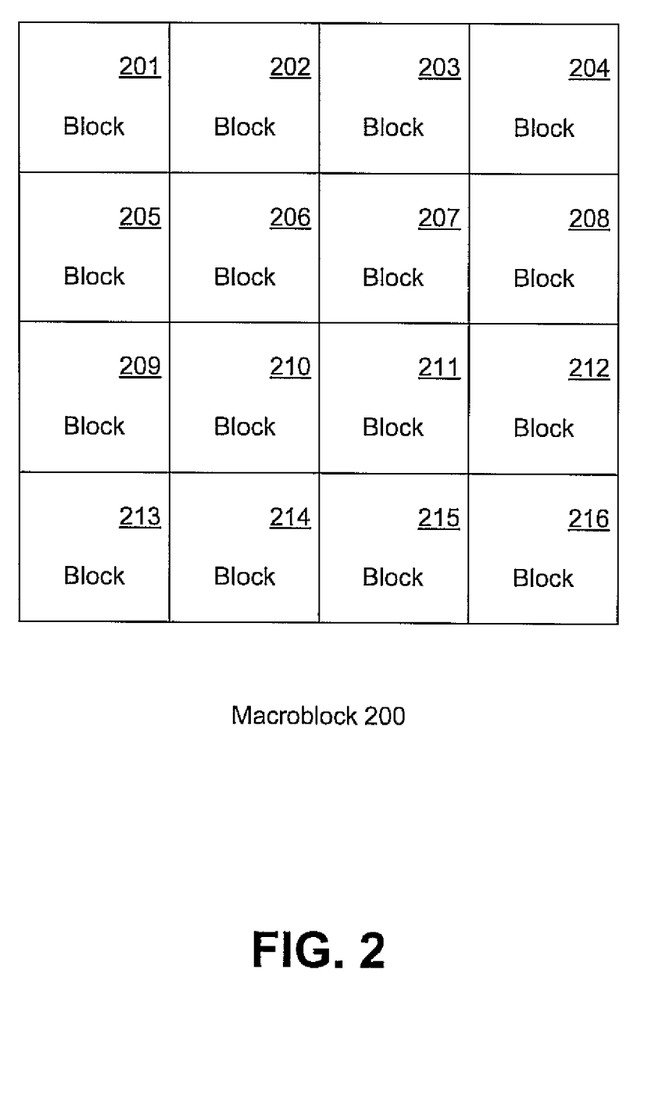
FIG. 2 depicts an exemplary macroblock, in accordance with one embodiment of the present invention.

With reference now to FIG. 2, an exemplary macroblock 200 is depicted, in accordance with one embodiment. Macroblock 200 is shown as being divided up into 16 4×4 luma blocks, blocks 201 through 216. If macroblock 200 were to be compressed using the intra prediction process, selecting the best intra mode for each of these blocks would be the most computationally intensive portion of intra prediction.

| Intra 4x4 Prediction Mode Index | Name of Intra 4x4 Prediction Mode |
| --- | --- |
| 0 | Intra__4x4__Vertical |
| 1 | Intra__4x4__Horizontal |
| 2 | Intra__4x4__DC |
| 3 | Intra__4x4__Diagonal__Down__Left |
| 4 | Intra__4x4__Diagonal__Down__Right |
| 5 | Intra__4x4__Vertical__Right |
| 6 | Intra__4x4__Horizontal__Down |
| 7 | Intra__4x4__Vertical__Left |
| 8 | Intra__4x4__Horizontal__Up |

A traditional "linear" mode search scheme involves running through each of the nine possible prediction modes, as shown in Table 1. In several embodiments of the present invention, different search orders are used, depending upon the computed "most probable" or starting mode for each block. Examples of such search orderings are provided below, in Table 2. In different embodiments, different orderings may be appropriate.

| Start Intra Mode | Search Order of Remaining Intra Modes |
| --- | --- |
| 0 | 5, 7, 4, 3, 2, 6, 1, 8 |
| 1 | 8, 6, 2, 4, 5, 0, 7, 3 |
| 2 | 3, 7, 0, 5, 4, 6, 1, 8 |
| 3 | 2, 7, 0, 5, 4, 6, 1, 8 |
| 4 | 6, 5, 1, 0, 8, 7, 2, 3 |
| 5 | 4, 0, 6, 7, 1, 3, 2, 8 |
| 6 | 1, 4, 8, 5, 2, 0, 7, 3 |
| 7 | 0, 3, 2, 5, 4, 6, 1, 8 |
| 8 | 2, 1, 6, 4, 5, 0, 7, 3 |

Prediction Modes and Search Order

Figure 3:
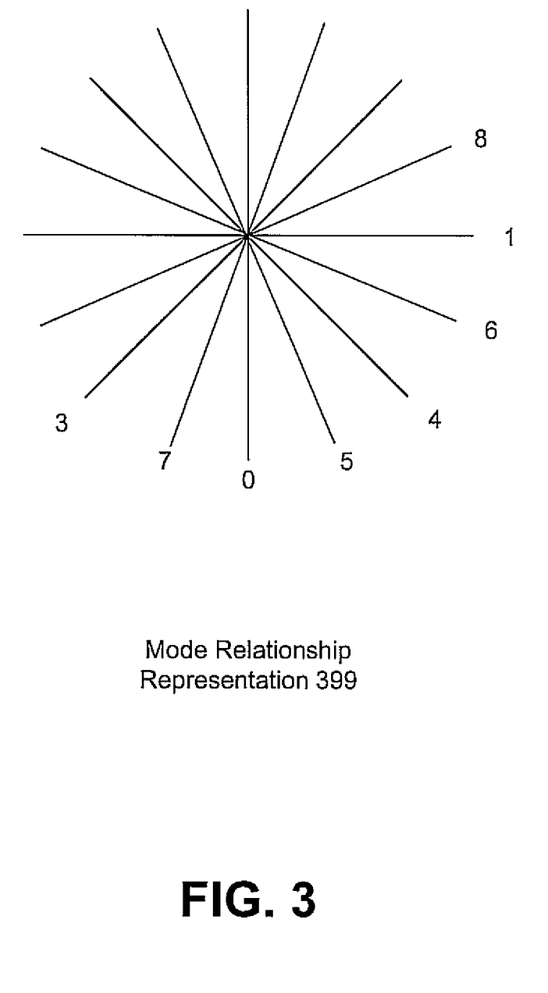
FIG. 3 depicts a representation of the relationship between predictor vectors, in accordance with one embodiment.

With reference now to FIG. 3, a representation 399 of the relationship between predictor vectors defined by the H.264 spec is provided, in accordance with one embodiment. In different embodiments, different relationships between prediction vectors may apply.

As discussed above, there are nine available intra prediction modes for a 4×4 luma block. The relationship between these modes can be represented as a vector diagram, such as representation 399. In this representation, the nine intra prediction modes are indicated by elements 0, 1, 3, 4, 5, 6, 7, and 8, which correspond to the Intra 4×4 Prediction Mode Indices given in Table 2, above. (Mode number 2 is the average value of the top and left neighboring pixels of a 4×4 block depending on their availability, and not a direction.)

One property of intra prediction in H.264 is that the "most probable" mode can be calculated for a particular luma block, often with reference to previously-processed block. For example, with reference to FIG. 2, calculating the most probable mode for block 206 would utilize information from blocks 202 and 205.

Even in situations where the most probable mode is not the optimal mode, the optimal mode is more likely to be one of the modes "close" to the most probable mode, as shown in representation 399. For example, with reference to FIG. 3 and Table 2, if the most probable mode is mode 4, the remaining nodes should be searched in order of their proximity to mode 4: 6, 5, 1, 0, 8, 7, 2, and 3. In different embodiments, these search orderings may be provided in different ways. For example, in one embodiment, the search orderings may be implemented as part of a lookup table, in either hardware or software.

Because the optimum mode is likely to occur closer to the most probable mode, in some embodiments, the number of searches performed can be limited with only a minimal effect on the quality of video compression. For example, rather than searching all nine modes for every block, only the six most likely modes may be evaluated, reducing the number of iterations by three for each block, and therefore by 48 for each macroblock.

Method of Intra Prediction Mode Search

Figure 4:
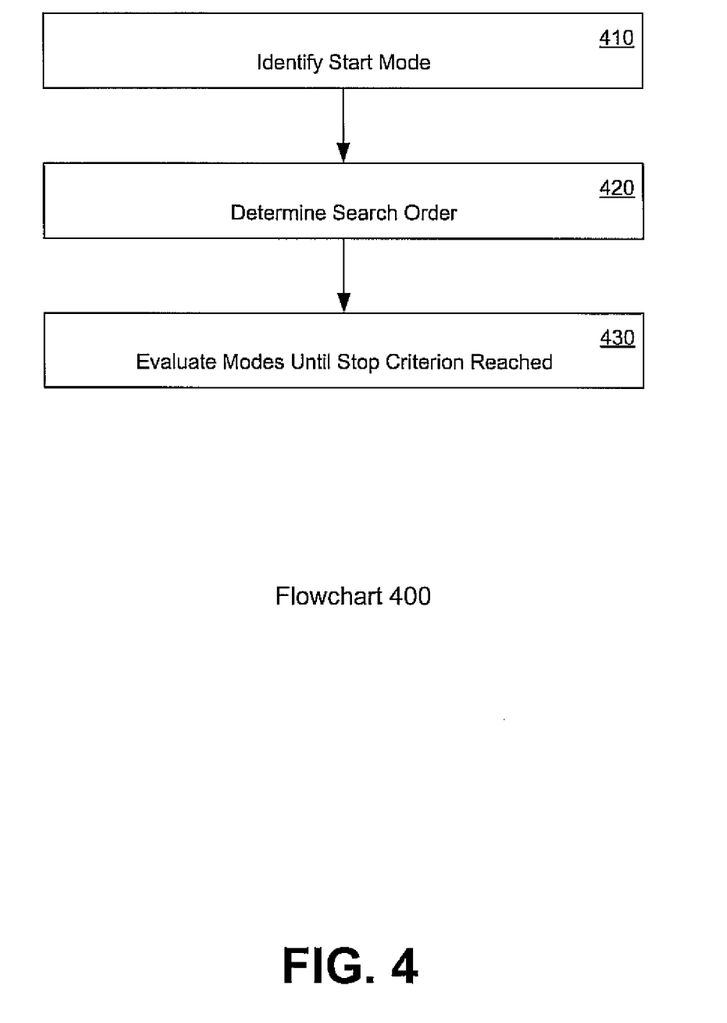
FIG. 4 depicts a flowchart of a method of performing an intra prediction mode search, in accordance with one embodiment.

With reference now to FIG. 4, a flowchart 400 of a method of performing an intra prediction mode search is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference now to step 410, a starting mode is identified. In some embodiments, the starting mode is the most probable mode calculated for a given block. In one such embodiment, the H.261 or standard provides a method of calculating the most probable mode for a given 4×4 luma block. In other embodiments, other approaches may be utilized.

With reference now to step 420, an appropriate search order is determined. In different embodiments, different approaches may be used for determining the appropriate search order. In one embodiment, a lookup table may be referenced, and an appropriate search order selected with reference to the starting mode. For example, with reference to Table 2, if the calculated most probable mode is 5, the appropriate search order would be 5, 4, 0, 6, 7, 1, 3, 2, 8; this lookup table may be implemented in hardware.

With reference now step 430, the modes are evaluated in the determined search order, until a stop criterion is reached. In different embodiments, different stop criteria may be utilized. In some embodiments, two stop criteria are defined: either a specified number of valid modes are evaluated, or all available valid modes are evaluated. In one such embodiment, not every mode may be valid for a particular block. Further, a number of valid modes to be evaluated may be fewer than the number of available valid modes; in this case, the search process identifies with the most optimum mode of those evaluated.

Method of 4×4 Luma Block Intra Prediction

Figure 5:
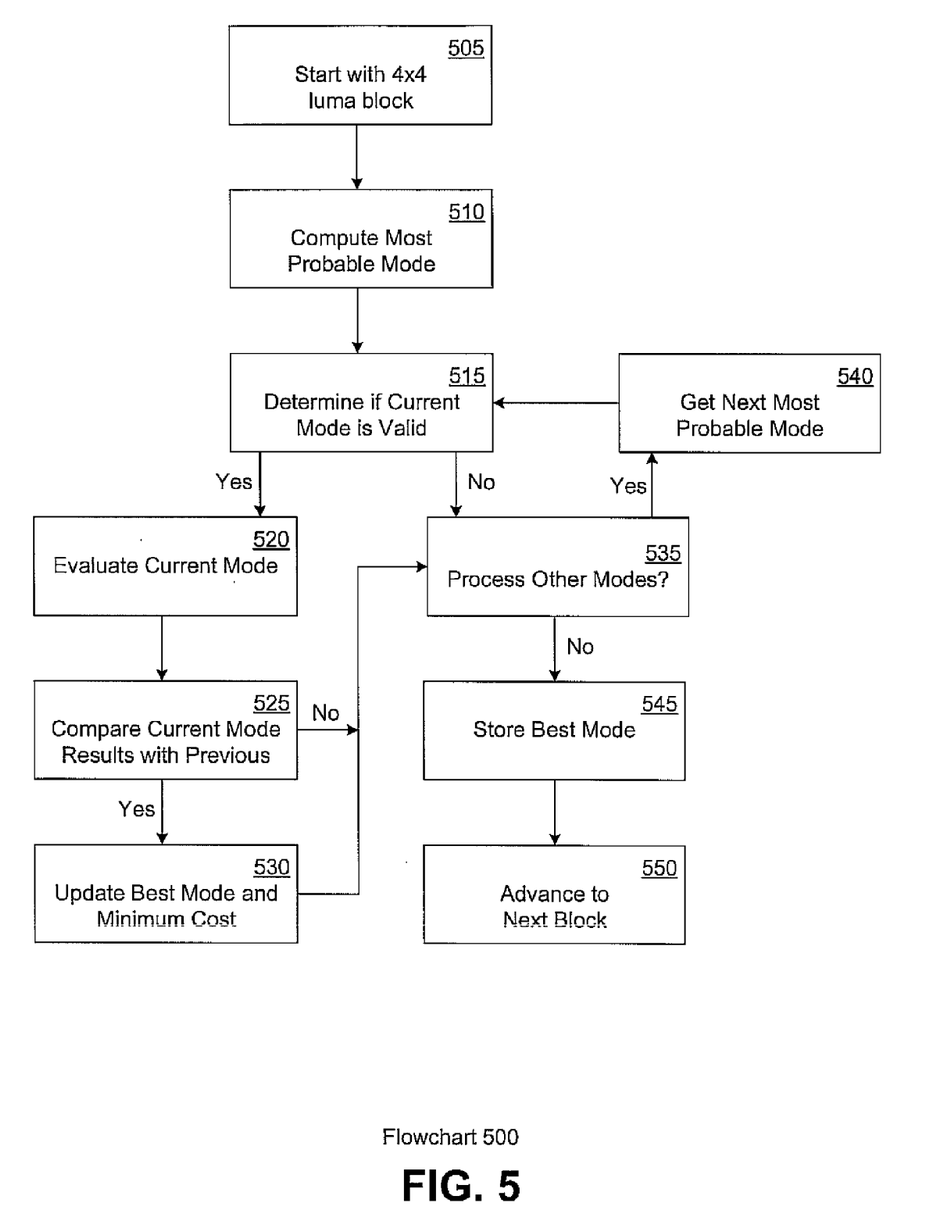
FIG. 5 depicts a flowchart of a method of intra prediction, in accordance with one embodiment.

With reference now to FIG. 5, a flowchart 500 of a method of intra prediction is depicted, in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference to step 505, the method begins with a given 4×4 luma block.

With reference now to step 510, the "most probable" mode for the selected block is computed. In one embodiment, the H.264 standard specifies a method of calculating the most probable mode for a given block. Further, in some embodiments, stop criteria are retrieved, e.g., a limit on the number of valid modes to evaluate.

With reference now to step 515, a determination is made, as to whether the current mode is valid. In some embodiments, not every prediction mode may be valid for every block; in one such embodiment, modes which are not valid should not be evaluated. In different embodiments, the invalid mode may or may not count against a stop criterion, e.g., such as a stop criterion limiting the number of modes to be evaluated for a given block. If the node is valid, the method continues to step 520. If the mode is not valid, the method passes to step 535.

With reference now to step 520, the valid mode is evaluated. In some embodiments, the mode may be fully evaluated against the current block. In other embodiments, the mode may be evaluated sufficiently to determine the computational cost of the valid mode.

With reference now to step 525, the results of evaluating the current mode are compared against those of previous modes. For example, in one embodiment, the costs of the current mode are compared against a stored "best" mode. If the current mode is an improvement over the previous modes, the method continues to step 530. If it is not, the method proceeds to step 535.

With reference now to step 530, these stored "best" mode is updated to reflect the current node.

With reference out of step 535, a determination is made, as to whether there are any other modes to process. In some embodiments, this involves determining whether every available mode has been processed. In other embodiments, this involves determining whether a stop criterion has been satisfied, e.g., a specified number of modes have been evaluated. If there are additional modes to process, the method continues to step 540. If there are not, the method continues to step 545.

With reference now to step 540, a new mode is selected. In some embodiments, the new mode is the next most likely mode, e.g., as described above with reference to Table 2. The method then returns to step 515, and iterates using the newly selected mode.

With reference now to step 545, the best mode is stored for future processing.

With reference now to step 550, the next block is selected for processing.

Exemplary Hardware Implementation

Figure 6:
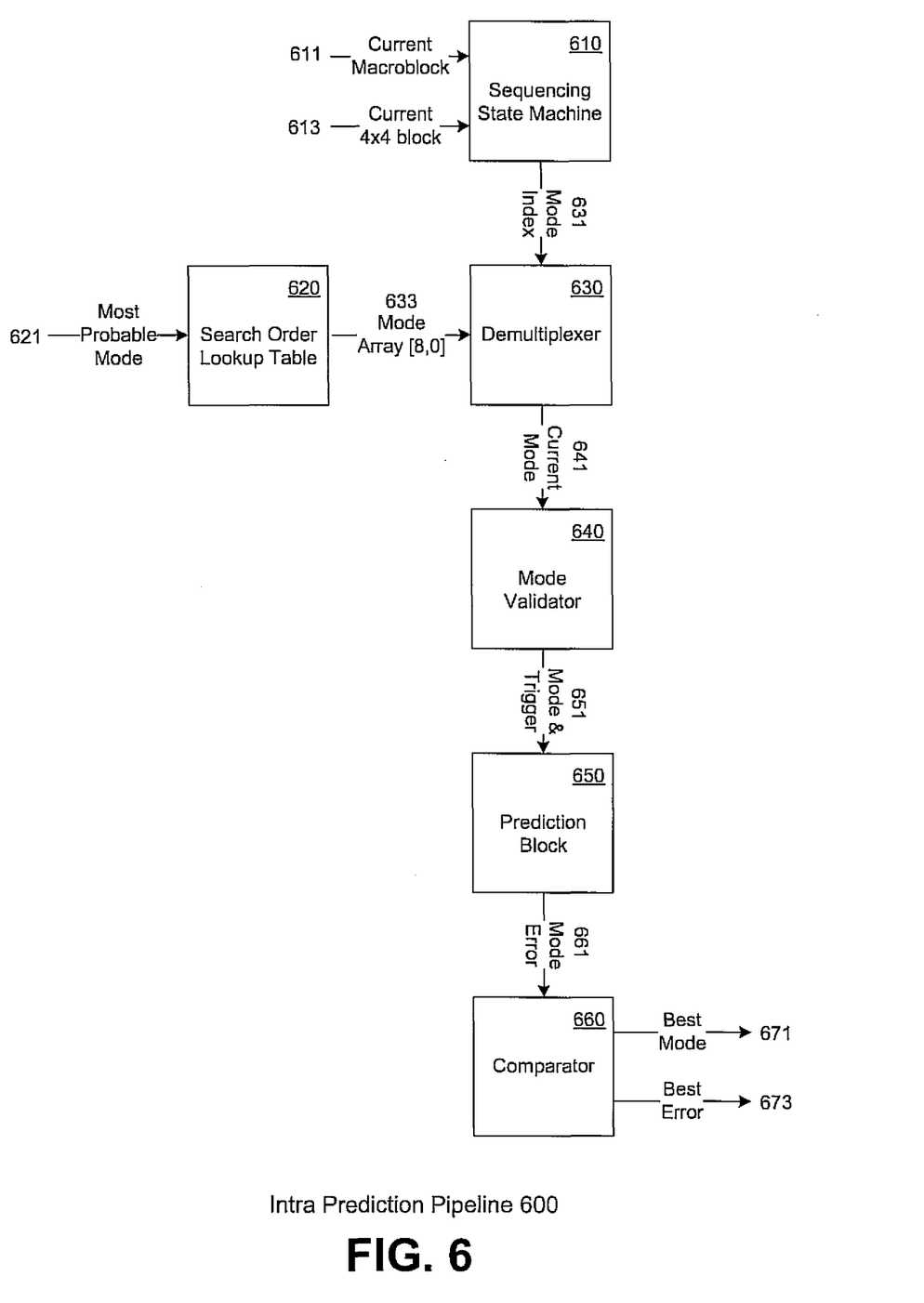
FIG. 6 depicts a block diagram of an exemplary intra prediction pipeline, in accordance with one embodiment.

With reference now to FIG. 6, a block diagram of an exemplary intra prediction pipeline 600 is depicted, in accordance with one embodiment. While pipeline 600 is shown as incorporating specific, enumerated features and elements, it is understood that embodiments are well suited to applications involving additional, fewer, or different features, elements, or arrangements.

Pipeline 600 is shown as including mode sequencing state machine 610. State machine 610 receives as input current macroblock 611 and current 4×4 block 613. In this embodiment, state machine 610 counts through all available modes, until a stop criterion is reached. For example, if a user specifies that encoding should involve evaluating six intra prediction modes per block, state machine 610 will count through six iterations.

Pipeline 600 also includes most probable mode search order lookup table 620. Lookup table 620 is addressed using computed most probable mode 621. Computed most probable mode 621 results in an ordered array of modes, such as shown in Table 2.

Demultiplexer 630 receives current mode 631 from state machine 610, and uses it to address mode array 633, received from lookup table 620. Demultiplexer 630 selects the correct mode from the array based on the current mode being processed.

Mode validator 640 receives the current mode 641 from demultiplexer 630, and references valid bits 643. Mode validator 640 checks that the current mode is valid; if it is, the mode will be processed.

Prediction block 650 receives the current mode and mode trigger 651 from mode validator 640. If mode trigger 651 indicates that the current mode is valid, prediction block 650 will compute the predicted pixels and the error from the reference pixels.

Comparator 660 receives the current mode error 661 from prediction block 650. Comparator 660 determines if current mode error 661 is it smaller than the previously calculated minimum. If it is, comparator 660 will update best mode 671 and best error 673.

Embodiments of the present invention are thus described. While the present invention has been described in particular embodiments, it should be appreciated that the present invention should not be construed as limited by such embodiments, but rather construed according to the following claims.

What is claimed is:

1. A method of selecting an optimum intra prediction mode, comprising:
    selecting a first intra prediction mode;
    determining a search order for a plurality of intra prediction modes with reference to said first intra prediction mode, wherein said search order defines a relationship between said first intra prediction mode and remaining intra prediction modes based on a vector representation of relationships between prediction vectors associated with said plurality of intra prediction modes, wherein said search order lists said intra prediction modes in order of probability with reference to said first intra prediction mode;
    evaluating said first intra prediction mode and at least one of said plurality of intra prediction modes following said search order to determine a plurality of computational costs; and
    comparing computational costs of each evaluated mode to identify said optimum intra prediction mode comprising a lowest computational cost.

2. The method of claim 1, wherein said selecting said first intra prediction mode comprises calculating a most probable intra prediction mode.

3. The method of claim 2, wherein said calculating said most probable intra prediction mode is performed in a manner consistent with a H.264 standard.

4. The method of claim 1, wherein said determining said search order comprises selecting said plurality of intra prediction modes in an order related to a relationship between each of said plurality of intra prediction modes and said first intra prediction mode.

5. The method of claim 1, wherein said determining said search order comprises accessing a lookup table, using said first intra prediction mode as an index.

6. The method of claim 1, wherein said evaluating is performed until a stop criterion is reached.

7. The method of claim 6, wherein said stop criterion comprises evaluating a specified number of intra prediction modes.

8. The method of claim 6, wherein said stop criterion comprises evaluating all valid intra prediction modes.

9. The method of claim 1, further comprising: determining whether said first intra prediction mode is valid; and determining whether each of said plurality of intra prediction modes is valid.

10. The method of claim 1, wherein said optimum intra prediction mode comprises an intra prediction mode for use with a 4.times.4 luma block in compliance with a H.264 encoding standard.

11. A non-transitory computer-readable medium having computer-executable instructions for performing steps comprising:
   computing a most probable intra prediction mode;
   selecting a plurality of intra prediction modes, including and with reference to said most probable intra prediction mode by selecting modes in an order of decreasing probability from said most probable intra prediction mode, wherein said order of decreasing probability is based on a vector representation of relationships between prediction vectors associated with said plurality of intra prediction modes with reference to said most probable intra prediction mode; and
   identifying an optimum intra prediction mode comprising a lowest computational cost from said plurality of intra prediction modes by evaluating said plurality of intra prediction modes in said order of decreasing probability to determine a plurality of computational costs.

12. The computer-readable medium of claim 11, wherein said selecting comprises accessing a lookup table with reference to said most probable intra prediction mode.

13. The computer-readable medium of claim 11, wherein said identifying in said instructions comprises evaluating each of said plurality of intra prediction modes.

14. The computer-readable medium of claim 13, wherein said identifying in said instructions further comprises evaluating each of said plurality of intra prediction modes until a stop criterion is reached.

15. The computer-readable medium of claim 14, wherein said stop criterion comprises a specified number of valid intra prediction modes.

16. A system for selecting an intra prediction mode, comprising:
   a prediction mode search order lookup table;
   a demultiplexer, coupled to said prediction mode search order lookup table;
   a prediction block, coupled to said demultiplexer;
   a comparator coupled to said prediction block, wherein said prediction mode search order lookup table selects an array of intra prediction modes in order of probability, with reference to a most probable intra prediction mode, said demultiplexer selects an intra prediction mode from said array, said prediction block evaluates said intra prediction mode, and said comparator determines whether said intra prediction mode is optimum; and
   a sequencing state machine, coupled to said demultiplexer, for indexing said array.

17. The system of claim 16, further comprising: a mode validator, coupled to said demultiplexer, wherein said mode validator determines if said intra prediction mode is valid.

18. The system of claim 16, wherein said demultiplexer sequentially selects a plurality of intra prediction modes from said array of intra prediction modes, until a stop criterion is reached.

* * * * *